F. KNIGHT.
WIND SHIELD.
APPLICATION FILED DEC. 12, 1911.
1,047,817.
Patented Dec. 17, 1912.
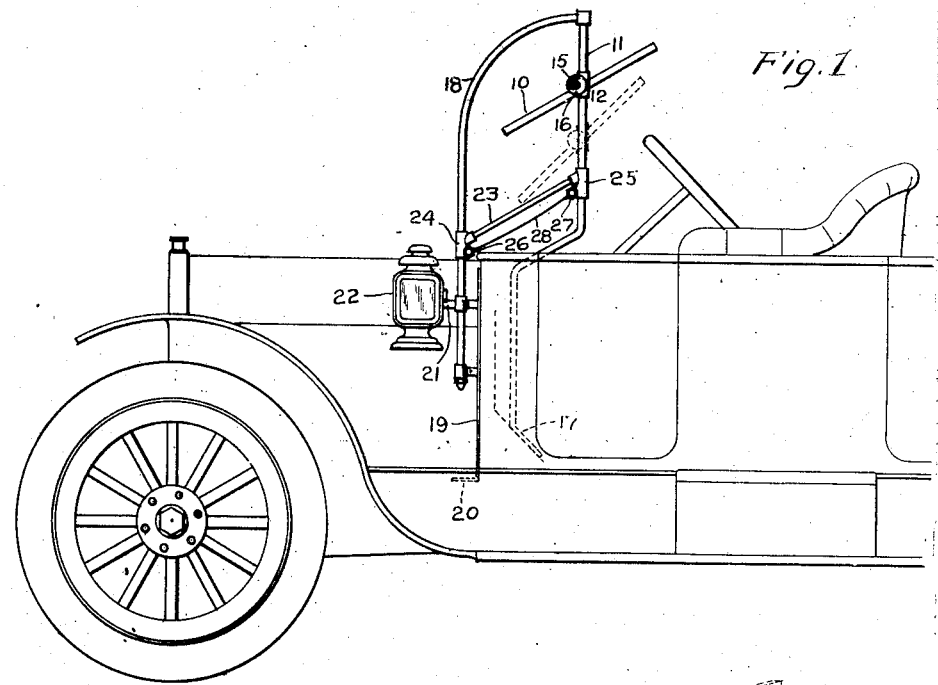
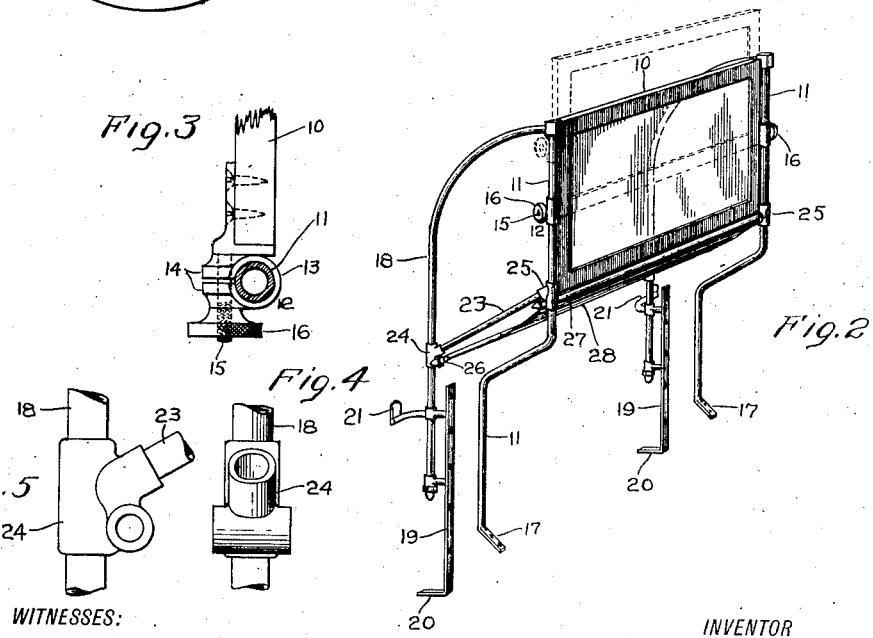
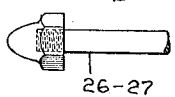
WITNESSES:
H. W. Meade
S. W. Atherton
INVENTOR
Frank Knight
BY
A. M. Wooster
ATTORNEY

UNITED STATES PATENT OFFICE.

FRANK KNIGHT, OF NEW HAVEN, CONNECTICUT.

WIND-SHIELD.

1,047,817.          Specification of Letters Patent.      Patented Dec. 17, 1912.

Application filed December 12, 1911. Serial No. 665,230.

*To all whom it may concern:*

Be it known that I, FRANK KNIGHT, a citizen of the United States, residing at New Haven, county of New Haven, State of Connecticut, have invented an Improvement in Wind-Shields, of which the following is a specification.

This invention has for its object to provide a simple and inexpensive wind-shield and supporting means therefor which will permit the shield to be raised or lowered bodily and to be swung at any desired angle while raised or lowered and to be locked at any vertical adjustment or angle of inclination by a simple but effective locking device.

With these and other objects in view I have devised the novel wind shield and supporting means therefor which I will now describe, referring to the accompanying drawing forming a part of this specification and using reference characters to indicate the several parts.

Figure 1 is an elevation of the forward portion of a motor car, illustrating the application of my novel wind-shield thereto, the shield being shown adjusted obliquely, and in another position in dotted lines; Fig. 2 a perspective of the wind shield and carrying frame detached, a raised position of the shield being indicated by dotted lines; Fig. 3 a detail plan view on an enlarged scale, showing one end of the shield and the locking clamp, the standard being in sections; Figs. 4 and 5 are elevations from different points of view of one of the hub castings; and Fig. 6 is a detail view showing an end of one of the apron rods and a knob.

10 denotes the wind shield which is vertically adjustable on standards 11 and which is furthermore capable of being adjusted obliquely at any desired angle with the top swung either inward or outward and when at any vertical adjustment within the limit of the standards. Both the vertical and the swinging adjustments are effected by means of clamps 12, a clamp being preferably placed at each end of the wind shield. Each clamp comprises a metal strap 13 which is adapted to closely grip the standard (see Fig. 3), the ends of said strap comprising outwardly extending eyes 14 having a transverse hole through them. Each end of the wind shield is provided with a pivot 15 which passes through both eyes and is threaded for engagement by a thumb nut 16. Tightening up the thumb nut causes the strap to grip the standard tightly and lock the wind shield at any height upon the standard and also through its engagement with the outer eye to lock the wind shield at any angle of swinging adjustment, as indicated in Fig. 1.

It should be understood that the invention is not limited to any special framework for supporting the windshield. In the present instance I have shown the standards as bent forward and downward below the wind shield, then straight downward and as provided at their ends with attaching plates 17 which are bent to correspond with the angle of the upwardly inclined forward end of the floor of a car (see dotted lines in Fig. 1) to which they are securely fastened by bolts or screws.

18 denotes stay rods which are connected to the standards at the top and extend forward and downward and are connected by means of brackets 19 to plates 20 which are themselves bolted or otherwise rigidly secured to the dashboard or to the front of the car. The upper brackets 19 are shown as provided with holders 21 which are detachably engaged by lamps 22.

23 denotes braces extending obliquely between the standards and the stay rods.

The standards, stay rods and braces are ordinarily made of tubing and are connected together by suitable hub castings 24 and 25, with which the braces have threaded engagement.

26 and 27 denote cross rods extending respectively between the two hub castings 24 and the two hub castings 25, and 28 an apron carried by said rods and extending from the top of the dashboard or front of a car backward and upward obliquely to the standards. The function of this apron is to shut out air currents, *i. e.* to prevent them from passing between the dashboard or car front and the wind shield, adjustment of the wind shield enabling the occupants of the front seat to secure any desired amount of ventilation while at the same time their faces will be protected. For example—when the wind-shield is adjusted at a position approximating either the full line or dotted position in Fig. 1, the air will pass over the apron and under the shield thereby cooling the passengers and at the same time leaving their faces protected.

Having thus described my invention I claim:

1. An improvement in wind shields comprising upright standards, stay rods connected with the upper ends of said standards, said stay rods being curved forwardly and downwardly, means for rigidly securing the lower ends of said standards and said stay rods to a vehicle body, an inclined apron supported between said standards and said stay rods, a panel section, and means engaging said standards for supporting said panel section, said supporting means including means for adjusting the height and inclination of said panel section with relation to said apron.

2. An improvement in wind shields comprising upright standards, stay rods connected with the upper ends of said standards, said stay rods being curved forwardly and downwardly, means for rigidly securing the lower ends of said standards and said stay rods to a vehicle body, cross rods carried by said standards and said stay rods respectively, an inclined apron supported at its edges by said cross rods, a panel section, and means engaging said standards for supporting said panel section, said supporting means including means for adjusting the height and inclination of said panel section with relation to said apron.

3. An improvement in wind shields comprising upright standards, stay rods connected with the upper ends of said standards, said stay rods being curved forwardly and downwardly, means for rigidly securing the lower ends of said standards and said stay rods to a vehicle body, inclined brace rods connecting said standards and said stay rods, an inclined apron supported between said standards and said stay rods, a panel section, and means engaging said standards for supporting said panel section, said supporting means including means for adjusting the height and inclination of said panel section with relation to said apron.

In testimony whereof I affix my signature in presence of two witnesses.

FRANK KNIGHT.

Witnesses:
   S. W. ATHERTON,
   U. L. COATES.